United States Patent

[11] 3,626,216

[72] Inventor Tage Ake Siverth Bergman
Partille, Sweden
[21] Appl. No. 815,872
[22] Filed Apr. 14, 1969
[45] Patented Dec. 7, 1971
[73] Assignee Telefonaktiebolaget LM Ericsson
Stockholm, Sweden
[32] Priority May 22, 1968
[33] Sweden
[31] 6924/68

[54] PHASE SHIFTING CIRCUIT
1 Claim, 2 Drawing Figs.

[52] U.S. Cl. ........................................ 307/295, 307/262, 330/14
[51] Int. Cl. ........................................ H03f 3/26
[50] Field of Search ........................................ 307/214, 262, 295; 328/29, 55, 62, 70, 107, 153; 330/14, 30, 145

[56] References Cited
UNITED STATES PATENTS
3,154,750 10/1964 David et al. .................... 330/14
OTHER REFERENCES
Hunter, Handbook of Semiconductor Electronics, McGraw-Hill Book Company, Inc., Copyright 1956, Fig. 11.118, p. 11-65.

*Primary Examiner*—Donald D. Forrer
*Assistant Examiner*—L. N. Anagnos
*Attorney*—Hane & Baxley ABSTRACT: From the collector and the emitter respectively of a transistor amplifier, signals with a phase difference of 180° are obtained. Upon increasing frequency the phase difference decreases due to the frequency dependence of the parameters of the transistor. By connecting the respective windings of a transformer between ground potential and the collector and the emitter respectively of a transistor amplifier, output signals with a phase difference of 180° over a wide frequency range will be obtained.

INVENTOR
TAGE ÅKE SIVERTH BERGMAN
BY Hane and Baxley
ATTORNEYS

PHASE SHIFTING CIRCUIT

This invention refers to a phase-shifting circuit for generating from a high frequency signal with a phase difference of 180°.

The principle of using a transistor to generate two signals with a phase difference of 180° is known from for example the book "Data Transmission" by Bennett and Davey (interuniversity electronics series 1965), in which the two signals are obtained from the collector and the emitter respectively of the transistor. The parameters of a transistor are however greatly dependent on frequency, so that e.g. at frequencies in the VHF-range (30–300 MHz) the phase shift between the signals from the collector and the emitter respectively of a transistor will not be 180°. It is also known to use a transformer to obtain a phase difference of 180° between two signals, but the phase difference between the signals varies so heavily with the frequency within the actual frequency range (30–300 MHz) so that its practical use is considerably limited.

An object of the invention is to provide a phase-shifting circuit for generating, even at high frequencies, two signals with a phase difference of 180° e.g. for feeding a network for correction of delay distortion in a radio relay system, where it is of great importance that the two signals have a phase difference of 180° within the working frequency range.

The characteristics of a phase-shifting circuit according to the invention will appear from the claim.

Figure 1:
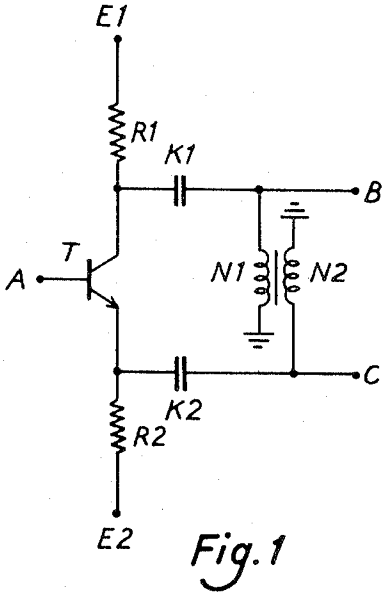
Figure 2:
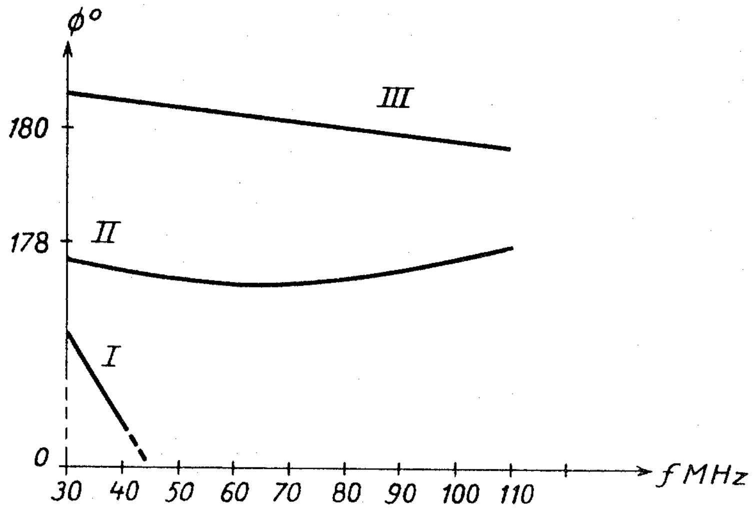

The invention will be described with reference to the accompanying drawing, where FIG. 1 shows a phase-shifting circuit according to the invention and FIG. 2 shows the phase difference between two output signals as a function of the frequency measured in phase-shifting circuits of three different types.

FIG. 1 shows an embodiment of a phase-shifting circuit according to the invention. A transistor T, according to the example a NPN-transistor is connected via a collector and an emitter resistance, R1 and R2 respectively to terminals E1 and E2 respectively of a direct voltage source. The resistance R1 is assumed to have the same value as the resistance R2. The phase-shifting circuit has an input A, connected to the base of the transistor T, and two outputs, B and C respectively from which the two signals having a phase difference of 180°, are obtained. The outputs are connected to the collector and the emitter respectively of the transistor T via capacitors K1 and K2. Between the outputs, a transformer N1, N2 with the transformation ratio 1:1 is connected so that one end of its winding N1 is connected to the output B and the other end of the winding N1 is connected to ground potential while one end of the winding N2 of the transformer is connected to the output C and the other end of the winding N2 is connected to ground potential.

Thus, when a signal is applied to the base of transistor T, an out of phase signal is generated at the collector and an in phase signal is generated at the emitter of the transistor. The output signals are passed via the coupling capacitors K1 and K2 respectively, to the output terminals B and C.

FIG. 2 shows a diagram of the relationship between the phase difference Φ between the output signals and the frequency *f* within the frequency range 30–110 MHz, on one hand measured in known arrangements and on the other hand measured in the phase-shifting circuit according to the invention. The waveform I shows the phase difference Φ between the two output signals of an arrangement in which the two signals are obtained from the respective windings of a transformer. As is shown, only a phase difference lower than 180° can be produced and the phase difference decreases considerably with increasing frequency depending among other things upon stray capacitances of the windings. The waveform II shows the phase difference between two output signals at an arrangement, where the two signals are obtained from the collector and the emitter respectively of a transistor amplifier. As can be seen, the phase difference as a function of the frequency is more uniform with this arrangement but the phase difference is so much below the required value of 180° (more than 1 percent due to the frequency dependent parameters of the transistor that the arrangement does not fulfill the condition of for example a feeding circuit of a network for the correction of delay distortion in radio relay transmissions. It has been found that, by combining these two arrangements in a phase-shifting circuit, it is possible to bring the phase difference between the output signals very close to 180° over a wide frequency range as illustrated by the diagram III in FIG. 2. This can be said to be a surprising effect since, starting from the two known arrangements, it is not obvious that the phase difference can be brought so close to 180° by combining the two known arrangements.

I claim:

1. A phase-splitting amplifier for high-frequency signals comprising a transistor having base, emitter and collector electrodes, a direct voltage source having first and second terminals, the base of said transistor being adapted to receive the high-frequency signals, first resistance means for connecting said emitter electrode to said first terminal, second resistance means for connecting said collector electrode to said second terminal, a transformer having first and second windings, each of said windings having first and second ends, means for connecting the first ends of each of said windings to a constant DC potential, means for connecting the second end of said first winding to said collector electrode, and means for connecting the second end of said second winding to said emitter electrode, whereby the signals at said second ends of said windings generated in response to signals received by said base electrode have a phase difference of substantially 180 electrical degrees.

* * * * *